United States Patent
Nakajima et al.

(10) Patent No.: US 7,495,695 B2
(45) Date of Patent: Feb. 24, 2009

(54) IMAGE PROCESSING DEVICE AND METHOD CAPABLE OF EMPHASIZING THE CONTRAST OF AN IMAGE TAKEN BY AN IMAGE SENSOR

(75) Inventors: Atsushi Nakajima, Sayama (JP); Takeshi Morishita, Sayama (JP); Hideo Seki, Sayama (JP)

(73) Assignee: Honda Giken Kogyo K.K., Minamiaoyama, Minato-ku, Tokyo (JP)

( * ) Notice: Subject to any disclaimer, the term of this patent is extended or adjusted under 35 U.S.C. 154(b) by 980 days.

(21) Appl. No.: 10/623,940

(22) Filed: Jul. 18, 2003

(65) Prior Publication Data
US 2005/0012847 A1    Jan. 20, 2005

(51) Int. Cl.
H04N 5/228 (2006.01)
H04N 5/202 (2006.01)
H04N 3/14 (2006.01)
H04N 5/238 (2006.01)
H04N 1/40 (2006.01)
G06K 9/40 (2006.01)

(52) U.S. Cl. ............ 348/222.1; 348/308; 348/365; 348/254; 382/274; 358/3.01

(58) Field of Classification Search .......... 348/235, 348/365, 222.1, 252, 254, 308; 382/274; 358/3.01
See application file for complete search history.

(56) References Cited

U.S. PATENT DOCUMENTS

| | | | | | |
|---|---|---|---|---|---|
| 4,973,833 | A | * | 11/1990 | Takada et al. | 250/208.1 |
| 5,946,407 | A | * | 8/1999 | Bamberger et al. | 382/274 |
| 6,141,450 | A | * | 10/2000 | Chen et al. | 382/237 |
| 6,191,408 | B1 | * | 2/2001 | Shinotsuka et al. | 348/241 |
| 6,778,186 | B2 | * | 8/2004 | Mehigan | 345/596 |
| 6,816,191 | B1 | * | 11/2004 | Shyu | 348/365 |
| 7,042,522 | B2 | * | 5/2006 | Kim | 348/671 |
| 2002/0041404 | A1 | * | 4/2002 | Shinotsuka et al. | 358/514 |
| 2003/0107681 | A1 | * | 6/2003 | Otawara et al. | 348/673 |

FOREIGN PATENT DOCUMENTS

JP    2000-329616    11/2000

* cited by examiner

*Primary Examiner*—Nhan T Tran
(74) *Attorney, Agent, or Firm*—Fulbright & Jaworski LLP

(57) ABSTRACT

An image processing device and method which is provided with means for converting image data from an image sensor into image data emphasizing a change in brightness in each of plural divisions of a whole luminous area by using a conversion table and which is therefore capable of easily and immediately enhancing the contrast of an image taken by an image sensor possessing a wide dynamic range of its logarithmic output characteristic.

4 Claims, 12 Drawing Sheets

IMAGE PROCESSING DEVICE AND METHOD CAPABLE OF EMPHASIZING THE CONTRAST OF AN IMAGE TAKEN BY AN IMAGE SENSOR

BACKGROUND OF THE INVENTION

The present invention relates to an image processing device and method capable of enhancing the contrast of an image taken by an image sensor.

Typically, an image sensor having a specially wide dynamic range is needed to be used in order to take an image of a subject including a very light (highlight) portion and dark (shadow) neighboring portions, for example, when detecting a white divisional line indicated on a road in a view ahead of a vehicle running into or out of a tunnel or in the case of monitoring the conditions of a work being manufactured by welding or laser, plasma or flame machining.

Japanese Laid-open Patent Publication No. 2000-329616 discloses an image sensor having a logarithmic output characteristic to widen its dynamic range, which comprises a matrix of light sensor circuits each of which represents a unit pixel and works in such a way that sensor current corresponding to a quantity of incident light is produced and converted by a photodiode (photoelectric converting element) into an electric voltage having a logarithmic characteristic in a weak inverse state by using the subthreshold region property of the transistor and, then, a sensor signal corresponding to the voltage signal is produced and output.

The image sensor possessing a wide dynamic range of its logarithmic output characteristic can take an image of any subject with a wide range of brightness from a very light portion to a dark portion but cannot assure the sufficient contrast of the image because the brightness is logarithmically compressed.

For example, when an image taken by the above-described image sensor is displayed on a monitor screen and visually estimated, the logical processing of the image by a computer is needed in order to increase the image contrast but such processing takes much time, making it impossible to do real-time analysis of the image.

SUMMARY OF THE INVENTION

Accordingly, the present invention has as its object the provision of an image processing device capable of enhancing the contrast of an image taken by an image sensor having a wide range of its logarithmic output characteristic by processing the image easily and immediately by the use of a conversion table for converting image data from the image sensor into image data emphasizing differences of brightness in each of plural brightness areas.

PREFERRED EMBODIMENTS OF THE INVENTION

Figure 1:
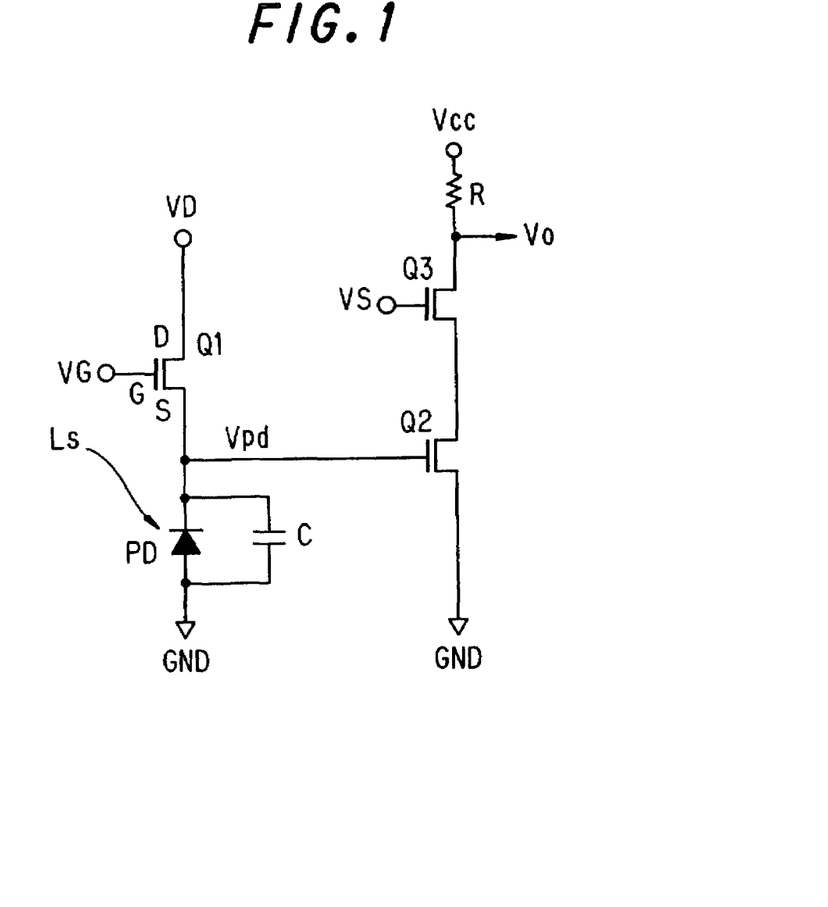
FIG. 1 is a circuit diagram depicting an exemplary construction of a light sensor circuit representing a unit pixel in an image sensor to which the present invention is applied.

FIG. 1 illustrates an exemplary construction of a light sensor circuit used as a unit pixel in an image sensor to which the present invention is applied.

The light sensor circuit comprises a photo-diode PD operating as a photoelectric converting element for producing a sensor current proportional to a quantity of incident light Ls falling thereon, a transistor Q1 having a logarithmic output characteristic in a weak inverse state for converting the sensor current produced in the photodiode into a voltage signal Vpd by using the property of its subthreshold region and a transistor Q2 for amplifying the voltage signal Vpd and a transistor Q3 for outputting a sensor signal Vo in accordance with a timing pulse of a reading signal Vs.

The above-mentioned light sensor circuit can produce a sensor current in the transistor Q1 while a sufficient quantity of light Ls is falling on the photodiode PD and can therefore detect a light signal at a response speed sufficient not to produce an afterimage of the pixel owing to a relatively small value of resistance of the transistor Q1. However, the transistor Q1 is set to operate with resistance increased by one order when a current therein decreases by one order. Therefore, decreasing the current flowing in the transistor Q1 with a decrease in the quantity of incident light Ls falling on the photodiode PD causes the transistor Q1 to rapidly increase its resistance. A time constant of the circuit containing a parasitic capacitor C of the photodiode PD with the increased resistance is increased to elongate time necessary for removing electric charge accumulated in the parasitic capacitor C.

Namely, an afterimage can be viewed for a longer duration as the quantity of incident light Ls decreases.

Figure 4:
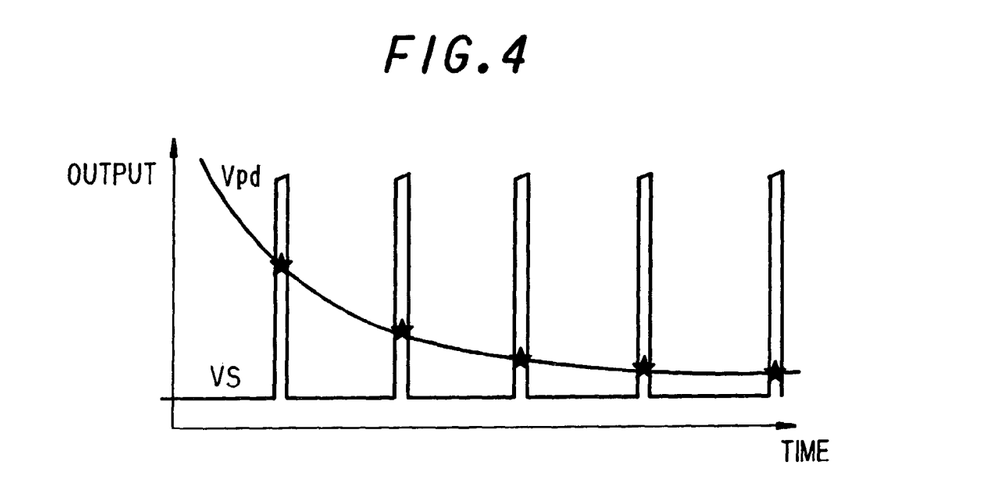
FIG. 4 shows an output characteristic of a sensor signal read-out at a specified timing when a small quantity of incident light falling on a sensor circuit without initialization.

Therefore, if a sensor signal is output in accordance with timing pulses of a reading signal Vs as shown in FIG. 4, an output appears with an afterglow that may be of a higher level at an earlier time. In FIG. 4, Vpd' designates an inverse amplified voltage signal produced by the amplifying transistor Q2.

The light sensor circuit is therefore provided with means of initializing itself before reading a sensor signal Vo by removing electric charge accumulated in the parasitic capacitor C of the photodiode PD by changing a drain voltage VD of the MOS type transistor Q1 to a level lower than normal for a specified period. This enables the light sensor circuit to immediately obtain a voltage signal corresponding to the quantity of light falling on it at that time even if a sensor current rapidly changed. Thus, the light sensor circuit may not cause an afterglow of the pixel even with a small quantity of incident light Ls.

Figure 2:
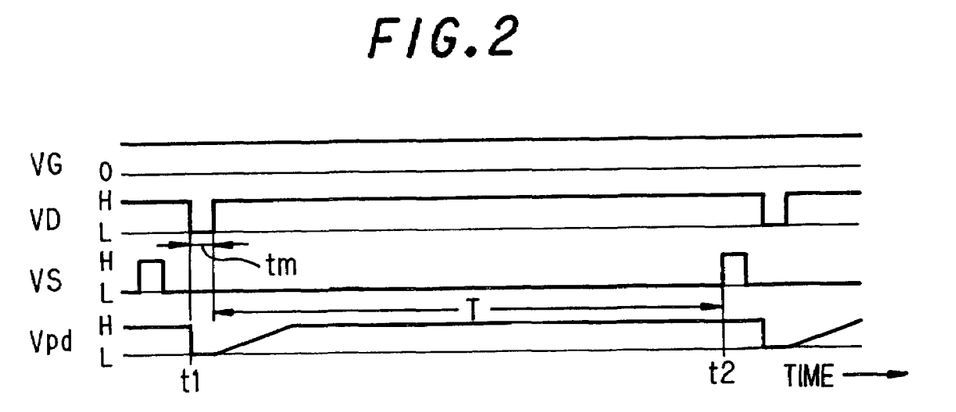
FIG. 2 is a time chart of signals generated by respective portions of the light sensor circuit of FIG. 1.

FIG. 2 shows a time chart of signals produced at various portions of the light sensor circuit in the above-described case. In FIG. 2, t1 is the initializing timing pulse and t2 is the light-signal detection timing pulse. A specified time tm for which the drain voltage VD of the transistor Q1 is switched from a normal value (high level H) to a lower voltage value (low level L) and kept at the low level L is set for example to about 5 microseconds in case of reading a pixel at a speed of about 100 nanoseconds. In FIG. 2, T designates a period for accumulating a charge in the parasitic capacitor C of the photodiode PD, which period is about ⅓₀ (or ⅙₀) seconds for a NTSC signal.

In the light sensor circuit, once the drain voltage VD of the transistor Q1 was switched over to the low level L for initializing the circuit, the transistor Q1 is brought into the low-resistance state if a potential between the gate voltage VG and the drain voltage VD is greater than a threshold value of the transistor Q1. Therefore, the source side potential at that moment becomes equal to the drain voltage VD (the source voltage becomes equal to the drain voltage for n-MOS type transistor), causing the junction capacitor C of the photodiode PD to be discharged.

Once the drain voltage VD of the transistor Q1 was changed to the normal value (high level H) with an elapse of the time tm and a light signal was then detected, the source side potential becomes lower than the drain voltage VD. If the difference between the gate voltage VG and the drain voltage VD is larger than the threshold, the MOS type transistor Q1 reaches the low-resistance state and allows the junction capacitor C of the photodiode to be charged again.

The junction capacitor C of the photodiode PD is discharged for initializing the light sensor circuit before detecting a light signal and then recharged. In this case, the output voltage Vpd (a terminal voltage of the photodiode PD) with an elapse of a specified time from the initializing timing becomes a value corresponding to the quantity of incident light Ls. In other words, the light sensor circuit after initialization can obtain a discharging characteristic with a specified time constant in response to a change in the quantity of incident light.

In that case, if the light sensor circuit is left as it is for a long time, a current supplied from the drain voltage VD through the transistor Q1 becomes equal to a current flowing in the photodiode PD. The same discharging characteristic can be thus always maintained as far as no charge remains. This eliminates the possibility of afterglow of the pixel.

The light sensor circuit can therefore obtain a sensor signal Vo corresponding to the quantity of incident light Ls with no afterglow of the pixel by detecting a light signal with an elapse of a specified time after initialization of the circuit.

Figure 3:
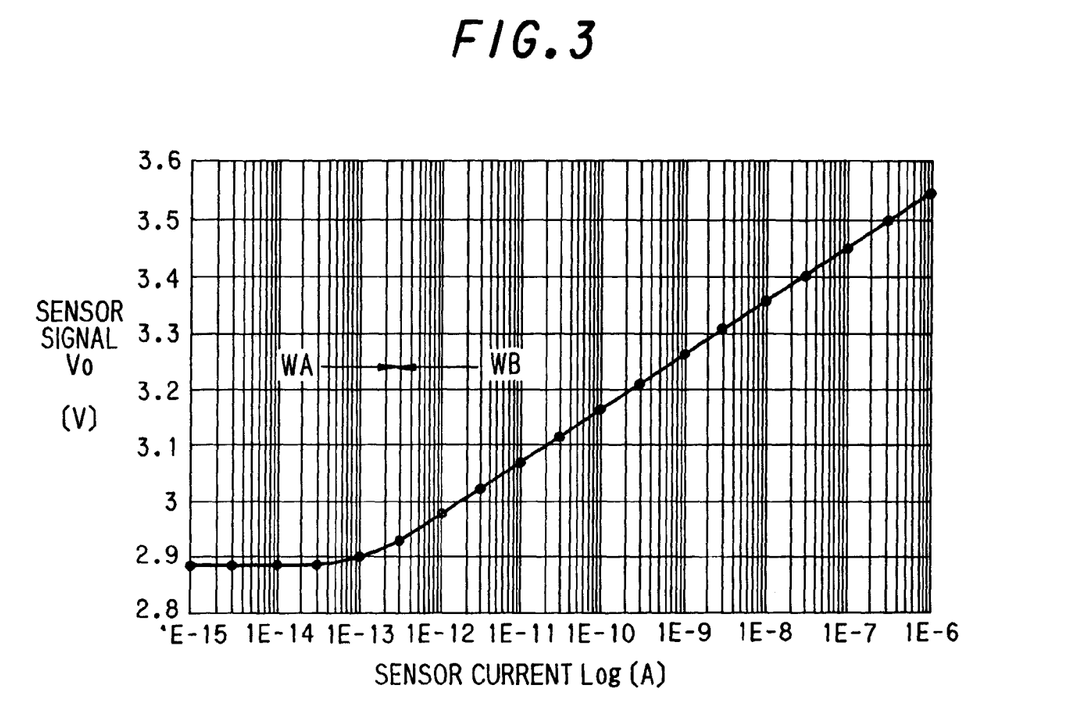
FIG. 3 shows an output characteristic of a sensor signal representing a sensor current flowing in the photo-diode, which corresponds to a quantity of incident light falling on the light sensor circuit.

FIG. 3 shows an output characteristic curve of the sensor signal, which is proportional to the current flowing in the photodiode in accordance with the quantity of incident light Ls falling on the photodiode. The diagram indicates that the sensor signal has a complete logarithmic output characteristic at a sufficient sensor current. It is also found that the output characteristic is substantially linear, not logarithmic, at a small value of the sensor current because of the delayed response when charging the parasite capacitor C of the photodiode PD. In FIG. 3, WA indicates the non-logarithmic response region and WB indicates the logarithmic response region.

Figure 5:
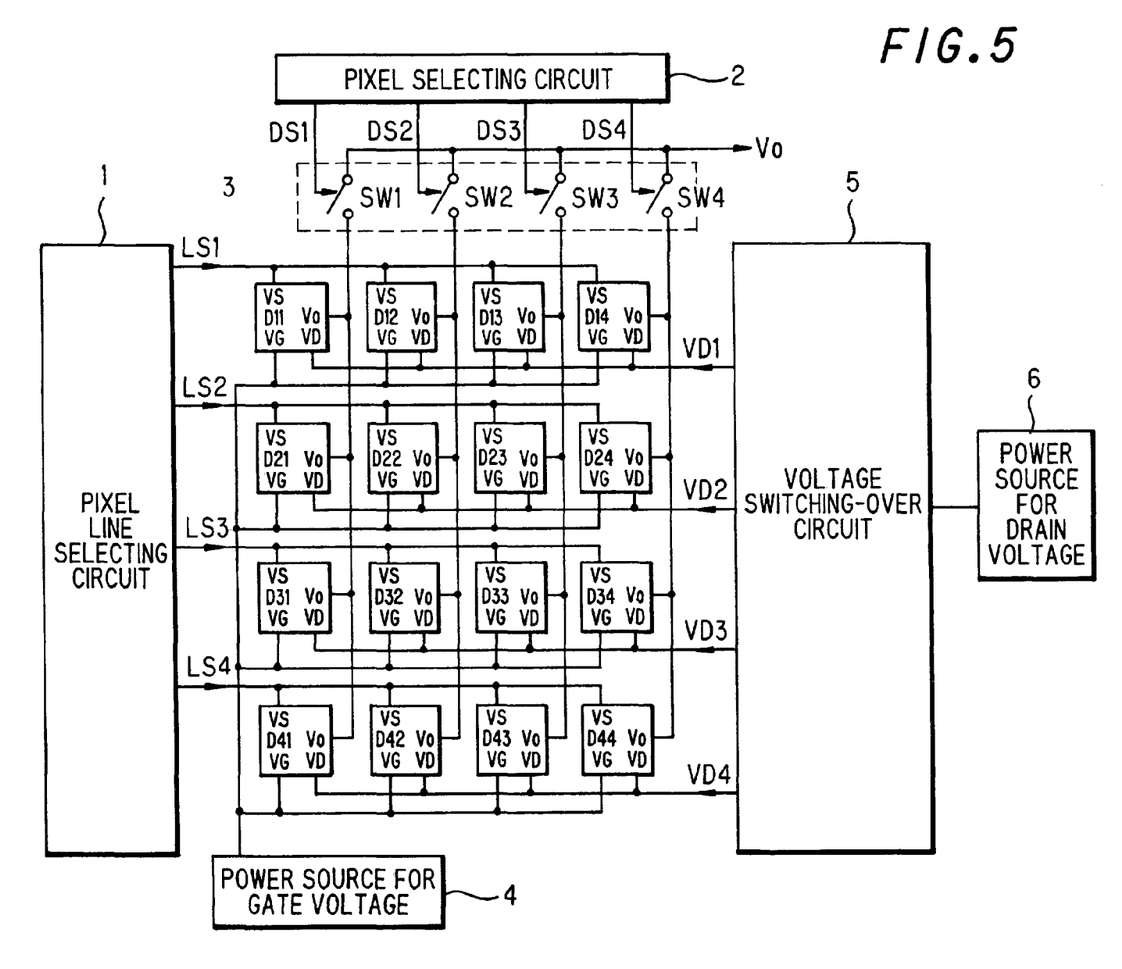
FIG. 5 is a block diagram showing an exemplary construction of an image sensor according to the present invention.

FIG. 5 illustrates an exemplary construction of an image sensor consisting of a number of the above-described light sensor circuits arranged to form a matrix of pixels (i.e., light sensor circuits), wherein sensor signals from respective pixels are read by scanning in a time series.

This image sensor is composed of 4×4 pixels D11~D44 arranged in a matrix of pixel circuits, in which pixel lines are selected one by one with respective selecting signals LS1~LS4 successively output from a pixel line selecting circuit 1 and pixels in each selected pixel line are readout one by one as respective sensor signals in such a manner that selecting signals DS1~DS4 successively output from a pixel selecting circuit 2 turn on corresponding switches SW1~SW4 in a group 3 to read sensor signals (pixel signals) Vo in a time series. In FIG. 5, numeral 4 designates a power source for gate voltage VG of the transistor Q1 and numeral 6 designates a power source for a drain voltage VD of the transistor Q1.

The image sensor thus constructed is also provided with a voltage switching-over circuit 5 by which a drain voltage VD of each transistor Q1 for each pixel is changed from a normal high-level H to an initializing low-level L by the effect of a specified timing pulse when selecting each line of pixels.

Figure 6:
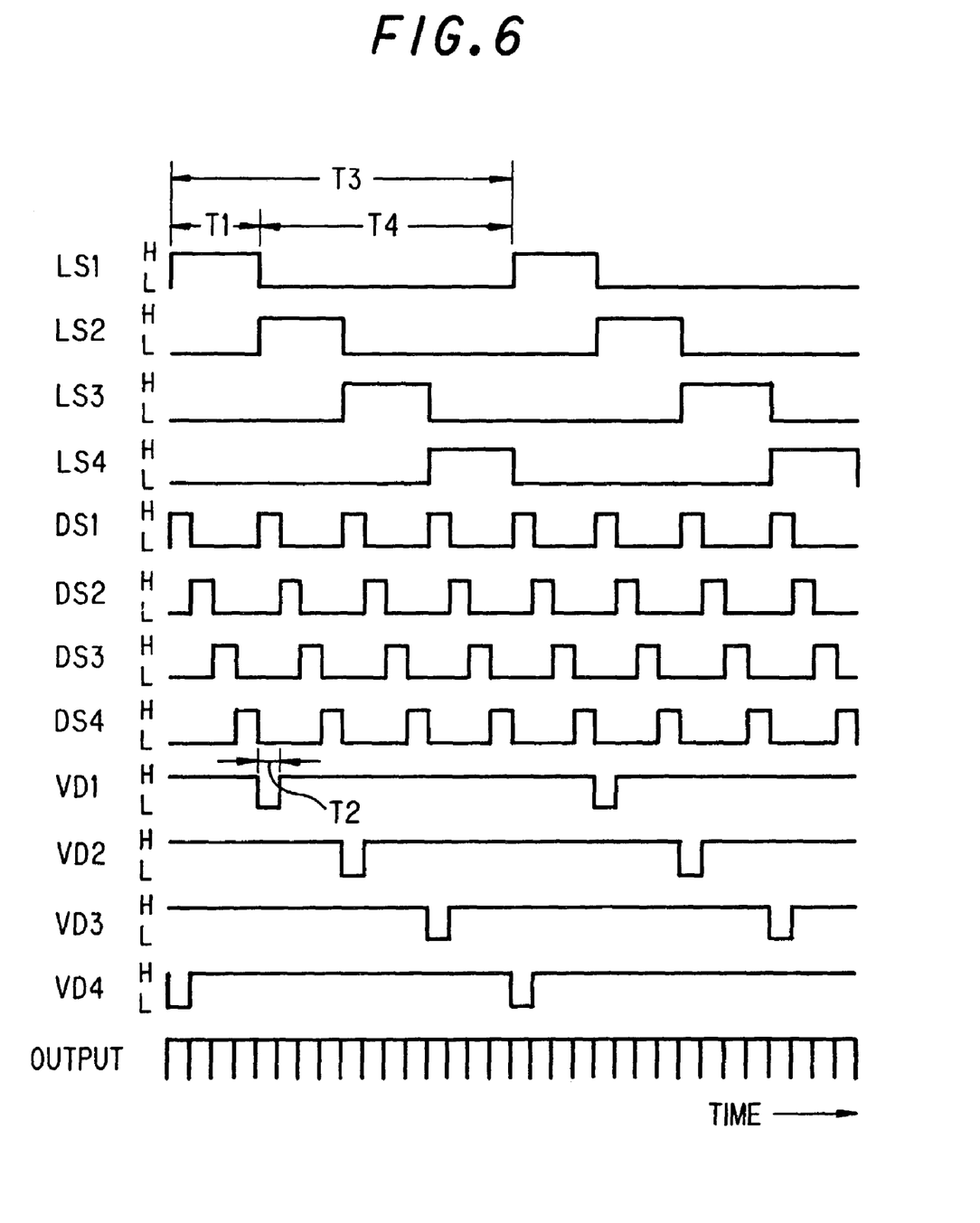
FIG. 6 is a time chart of signals generated by respective portions of the image sensor of FIG. 5.

The operation of the above-described image sensor according to the present invention will be described with reference to FIG. 6 showing a time chart of signals generated at respective portions of the image sensor.

Once the pixel-line selecting signal LS1 reached the high level H, the first pixel line including pixels (light sensor circuits) D11, D12, D13 and D14 is selected and, during a specified period T1 for which the signal LS1 remains at the high level H, pixel selecting signals DS1~DS4 successively reach the high level H to start the successive reading of sensor signals Vo of pixels D11, D12, D13 and D14.

As soon as the pixel-line selecting signal LS1 is changed to the low level L, a next pixel-line selecting signal LS2 is changed to the high level H to select the second pixel line containing pixels D21, D22, D23 and D24. For a specified period T1 for which the signal LS2 remains at the high level H, the pixel selecting signals DS1~DS4 successively reach the high level H to start the successive reading of sensor signals Vo pixels of D21, D22, D23 and D24.

Similarly, with the pixel-line selecting signals LS3 (LS4) changed to the high level H, the third (fourth) pixel line is selected and then, for a specified period T1 for which the signal LS3 (LS4) remains at the high level H, the pixel selecting signals DS1~DS4 successively reaches the high level H to start the successive reading of sensor signals Vo of pixels D31, D32, D33 and D34 (D41, D42, D43 and D44).

When the pixel-line selecting signal LS1 is changed to the low level L, the drain voltage VD1 for the pixels D11, D12, D13 and D14 in the first selected line is turned to the low level for a specified period T2 to make the pixels initialized and prepared for the next cycle of reading sensor signals, which cycle will be performed with the elapse of one cycle time T3.

When the pixel-line selecting signal LS2 is changed to the low level L after the period T1, the drain voltage VD1 for the pixels D21, D22, D23 and D24 in the second selected line is turned from the high level H to the low level L for the specified period T2 to initialize the pixels for the next sensor-signal reading cycle to be performed with the elapse of one cycle time T3.

Similarly, once the pixel-line selecting signal LS3 (LS4) is changed to the low level L after the period T1, the drain voltage VD3 (V4) for the pixels D31, D32, D33 and D34 (D41, D42, D43 and D44) in the third (fourth) selected line is turned from the high level H to the low level L to initialize the pixels for the next sensor-signal reading cycle to be performed with the elapse of one cycle time T3.

Although the drain voltage VDX is turned to the low level L to initialize each light sensor circuit with the pixel-line selecting signal LSX (X=1~4) decreased to the low level with elapse of the period T1, the initializing timing is within the duration T4 for which the pixel line selection is paused with the pixel-line selecting signal being at the low level L.

The timing of occurrence of signals at respective portions is decided by driving the pixel-line selecting circuit 1, the pixel selecting circuit 2 and the voltage switching-over circuit 5 under the control from a control circuit (not shown).

Initializing each pixel at the timing adapted to the scanning for reading each sensor signal may avoid an over or short charge-accumulating duration for the whole system of the image sensor.

An image sensor having a wide dynamic range of its logarithmic output characteristic without causing the afterglow of the pixels thus can be realized.

An image processing device according to the present invention is intended to realize easy and prompt processing of an image taken by the above-described image sensor so as to enhance the contrast of the image by converting image data from the image sensor into image data emphasizing a change in brightness in a plurality of luminance areas by the use of a conversion table for the image data output from the image sensor.

Figure 7:
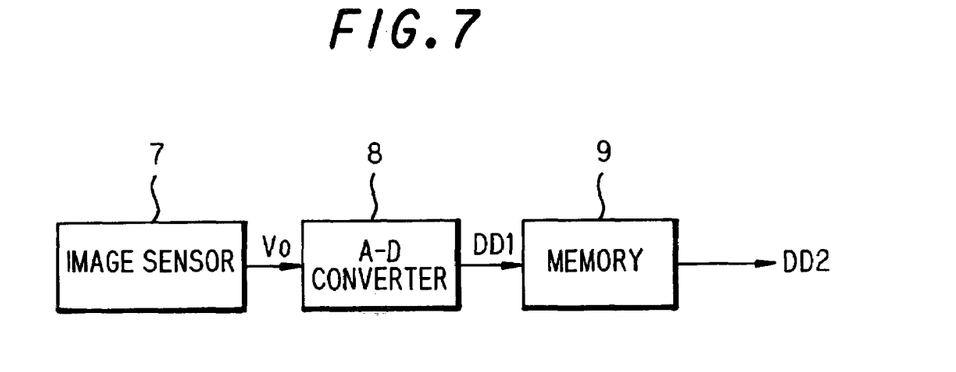
FIG. 7 is a block diagram showing an exemplary construction of an image processing device according to the present invention.

FIG. 7 illustrates an exemplary construction of an image processing device according to the present invention, which is applied for the above mentioned purpose.

In this device, sensor signals (analog signal) Vo representing respective pixels of an image taken and output in time series by an image sensor 7 are first converted into digital image data DD1 according to which digital image data DD2 specifically prepared in advance is then retrieved from an output conversion table preset in a memory 9 and output therefrom.

In the above-described arrangement, signals from the image sensor 7 having any output characteristic can be converted into any desirable image signals of desirable output characteristics by the use of the output conversion table stored in the memory 9.

Figure 8:
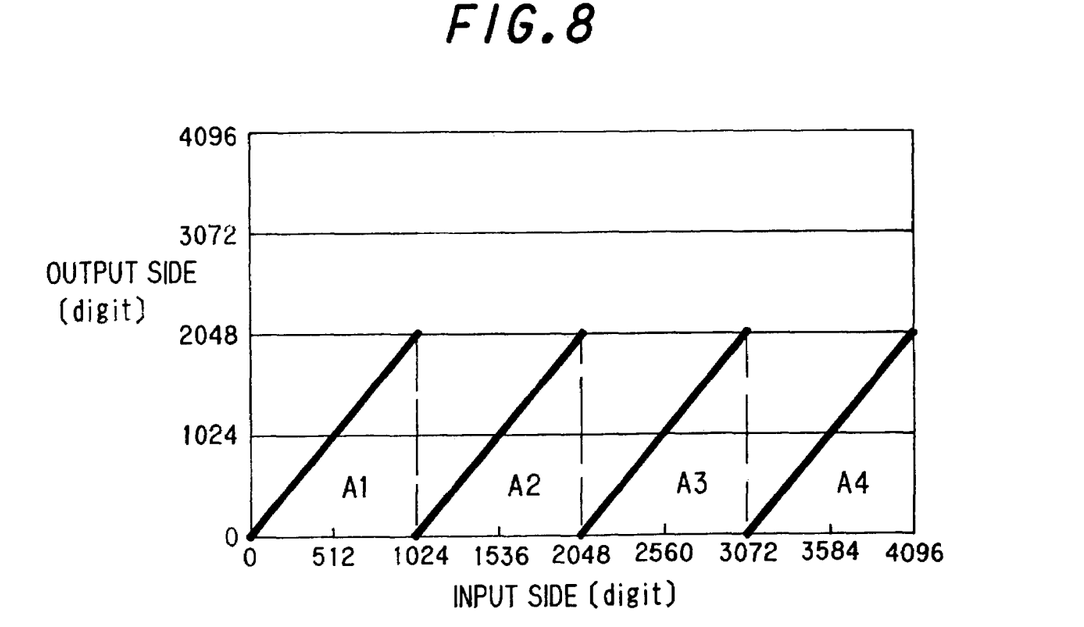
FIG. 8 shows an example of characteristics of input and output image data converted according to an output conversion table preset in a memory of the image processing device of FIG. 7.

FIG. 8 shows an exemplary output conversion table to be stored in the memory 9.

In this instance, sensor signals Vo of respective pixels being as image data to be output in a time series are converted by an A-D converter 8 into digital image data DD1 of 12 bits (4096 gradations), and a whole luminous area of 04096 gradations is divided into a plurality of continuous equivalent divisions to emphasize the continuous changing of brightness in the divisions.

In the shown example, a whole luminous area is divided into 4 equivalent luminous divisions A1~A4 each of 1024 gradations in width and a change in brightness in each of 4 divisions is continuously enhanced.

By using the conversion table as shown in FIG. 8, the digital image data DD1 taken by the image sensor 7 is converted into the digital image data DD2 that represents the luminance distribution like a contour map. (This distribution is called "gray level contour line map").

Figure 9:
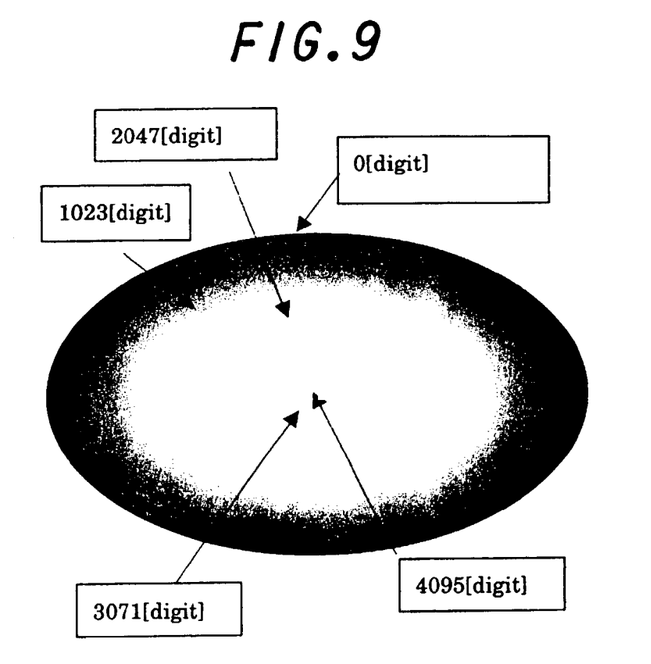
FIG. 9 shows an exemplary image taken by an image sensor.
Figure 10:
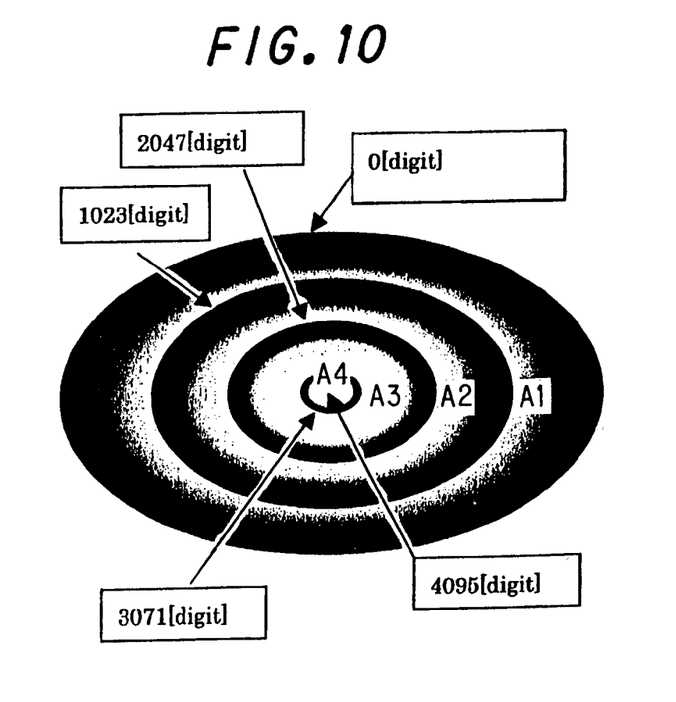
FIG. 10 shows an exemplary condition of an image obtained by processing the image of FIG. 9 by an image processing device according to the present invention.

When an image taken by the image sensor 7 being dark in its peripheral portion and gradually lighter toward the center of the image as, for example, shown in FIG. 9, is now processed by using the conversion table, then it is converted into an image in which variations in brightness in divisions A1~A4 are enhanced like contour lines as shown in FIG. 10.

Figure 11:
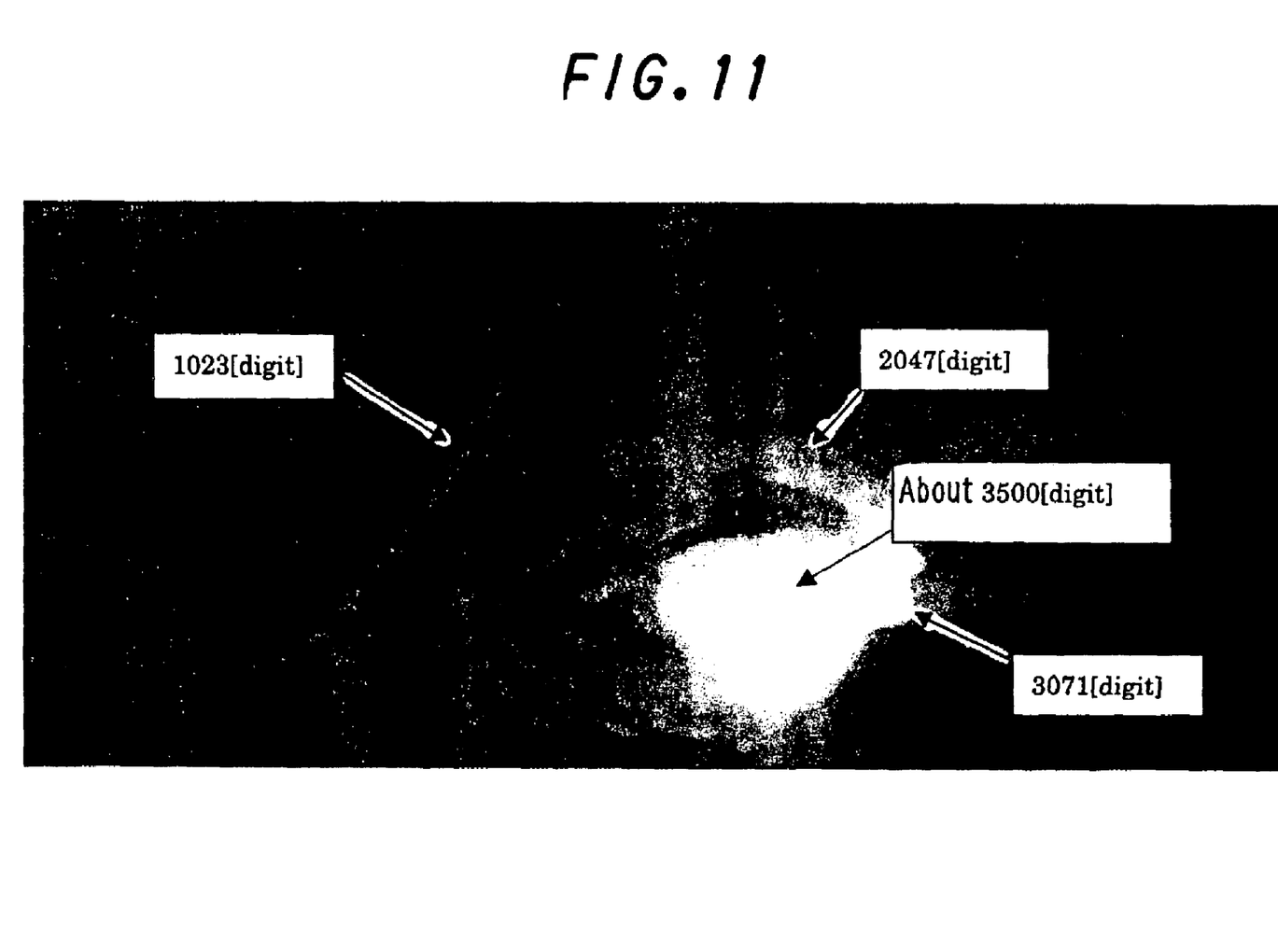
FIG. 11 shows another exemplary image taken by an image sensor.
Figure 12:
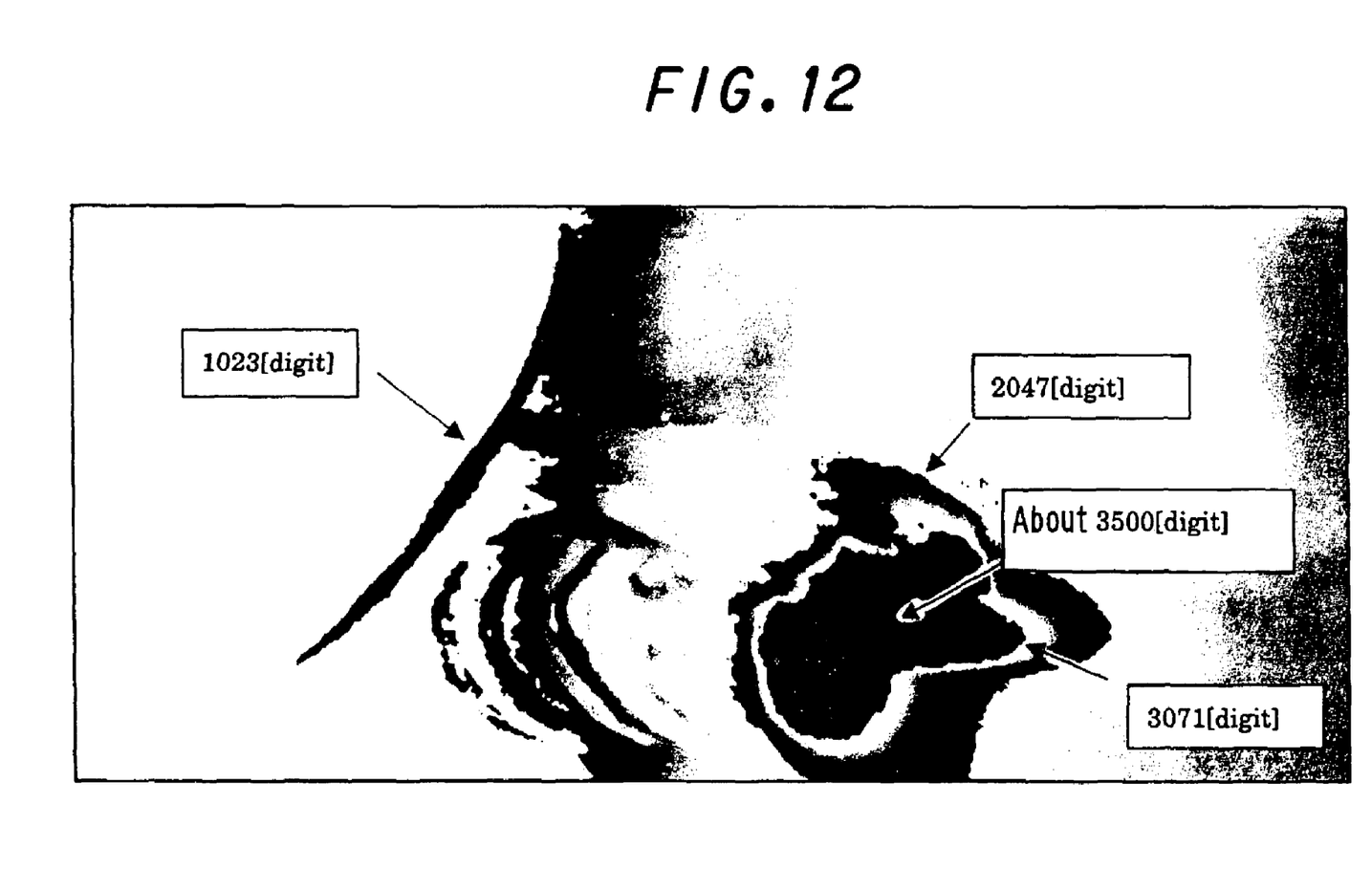
FIG. 12 shows an exemplary condition of an image obtained by processing the image of FIG. 11 by an image processing device according to the present invention.

Similarly, FIG. 11 shows an image of a laser welding portion, taken by the image sensor 7, and FIG. 12 shows an image of the same but processed by using the conversion table.

The luminance of each portion of the image can be visually recognized on a monitor screen by displaying thereon the image with variations in brightness as enhanced in the form of contour lines.

Figure 13:
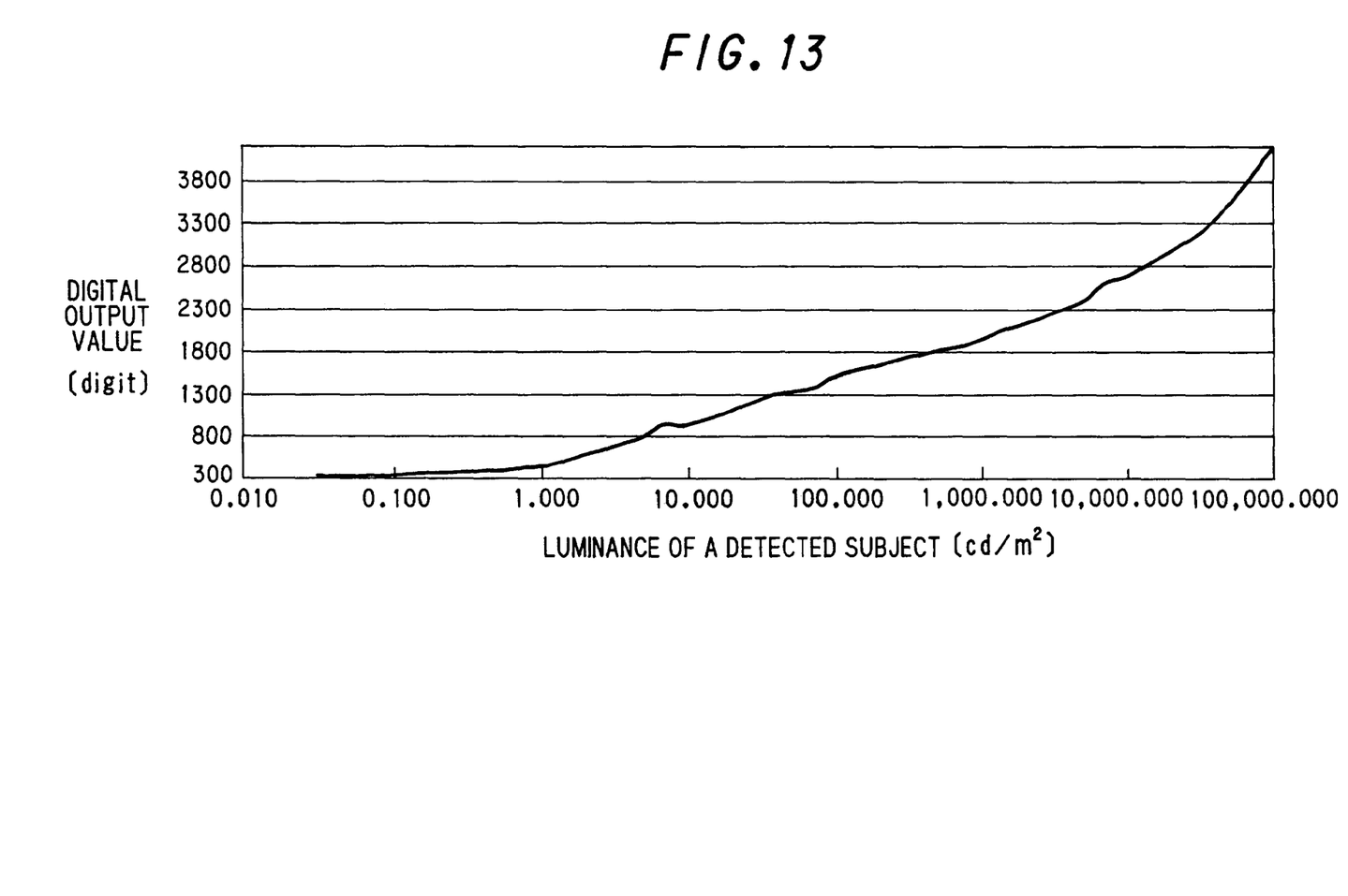
FIG. 13 shows an actual output characteristic of an image sensor according to the luminance distribution on an object in an image taken by the image sensor.

A procedure of determining the brightness of each portion of the image taken by the image sensor 7 is as follows:

Gradations of respective portions of the image processed by using the output conversion table, which has been enhanced like the contour lines, are first estimated from the content (preset data) of the output conversion table. The luminous intensities of respective portions are then determined by comparison of their luminance with gradations estimated from the processed image based on the previously determined output characteristics, as shown in FIG. 13, of the image sensor 7.

Thus, the image processing device according to the present invention makes it possible to evaluate simply and immediately the image quality.

A whole luminous area may be divided into a large number of divisions to emphasize detailed variations in brightness of the image.

Figure 14:
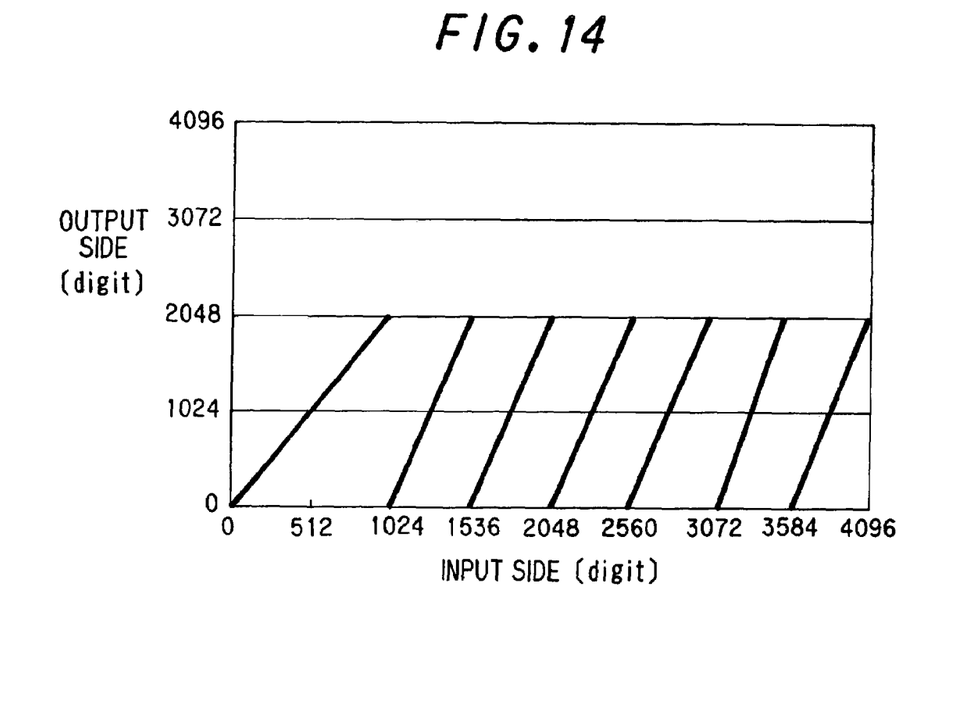
FIG. 14 shows another example of characteristics of input and output data converted according to an output conversion table.

It is also possible to randomly set the width of divisions of a whole luminous area of the image, for example, wider for a dark portion not requiring analysis of the luminance distribution or smaller for a dark portion requiring analysis of the luminance distribution as shown in FIG. 14. This makes it possible to effectively analyze the luminance distribution in accordance with practical purpose.

It is still possible to divide a whole luminous area into a plurality of discrete divisions and separately emphasize a change in brightness of each of the discrete divisions.

In this case, the brightness of each of the intermediate parts between the separate divisions is converted into halftone.

Figure 15:
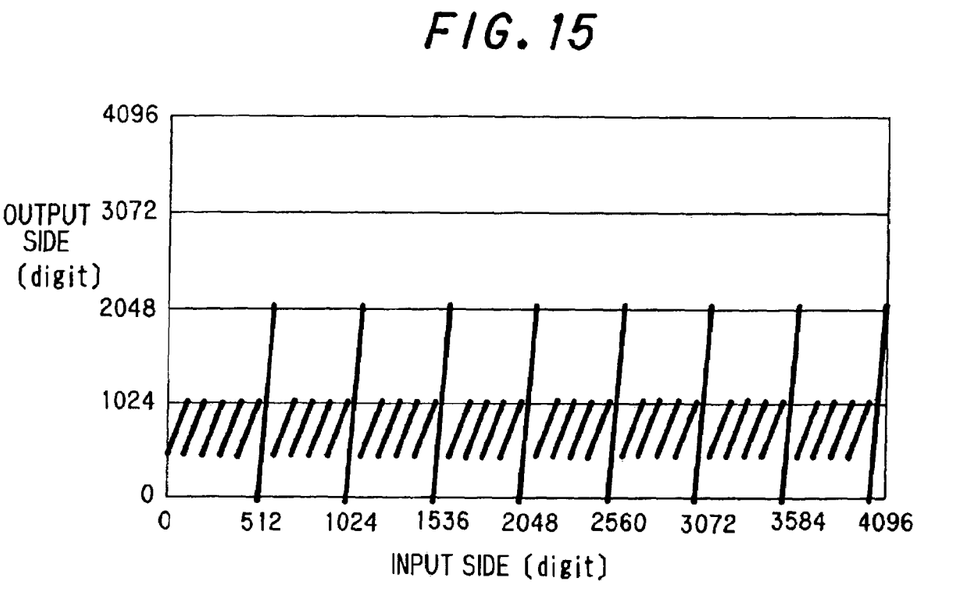
FIG. 15 shows a further example of characteristics of input and output data converted according to an output conversion table.
Figure 16:
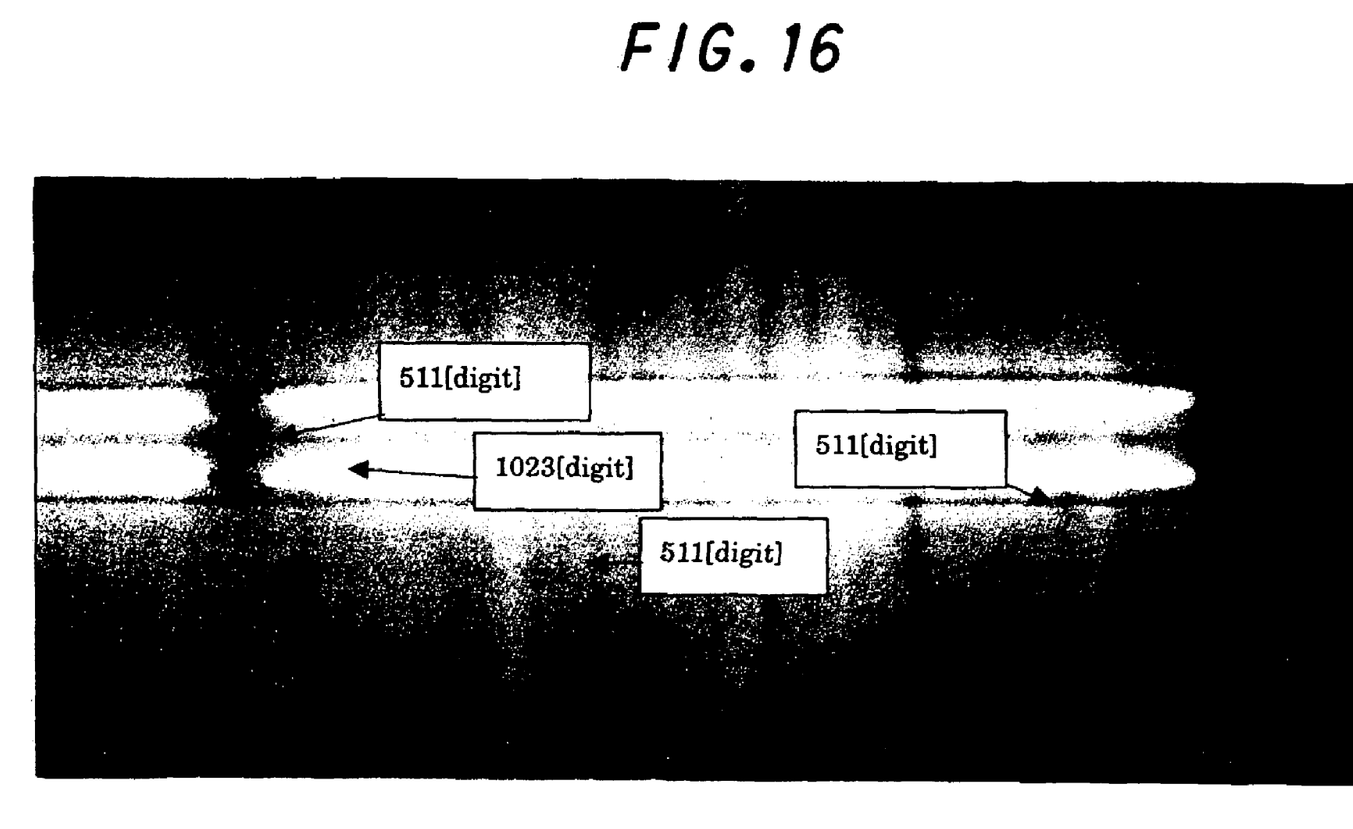
FIG. 16 shows another example of an image taken by an image sensor.
Figure 17:
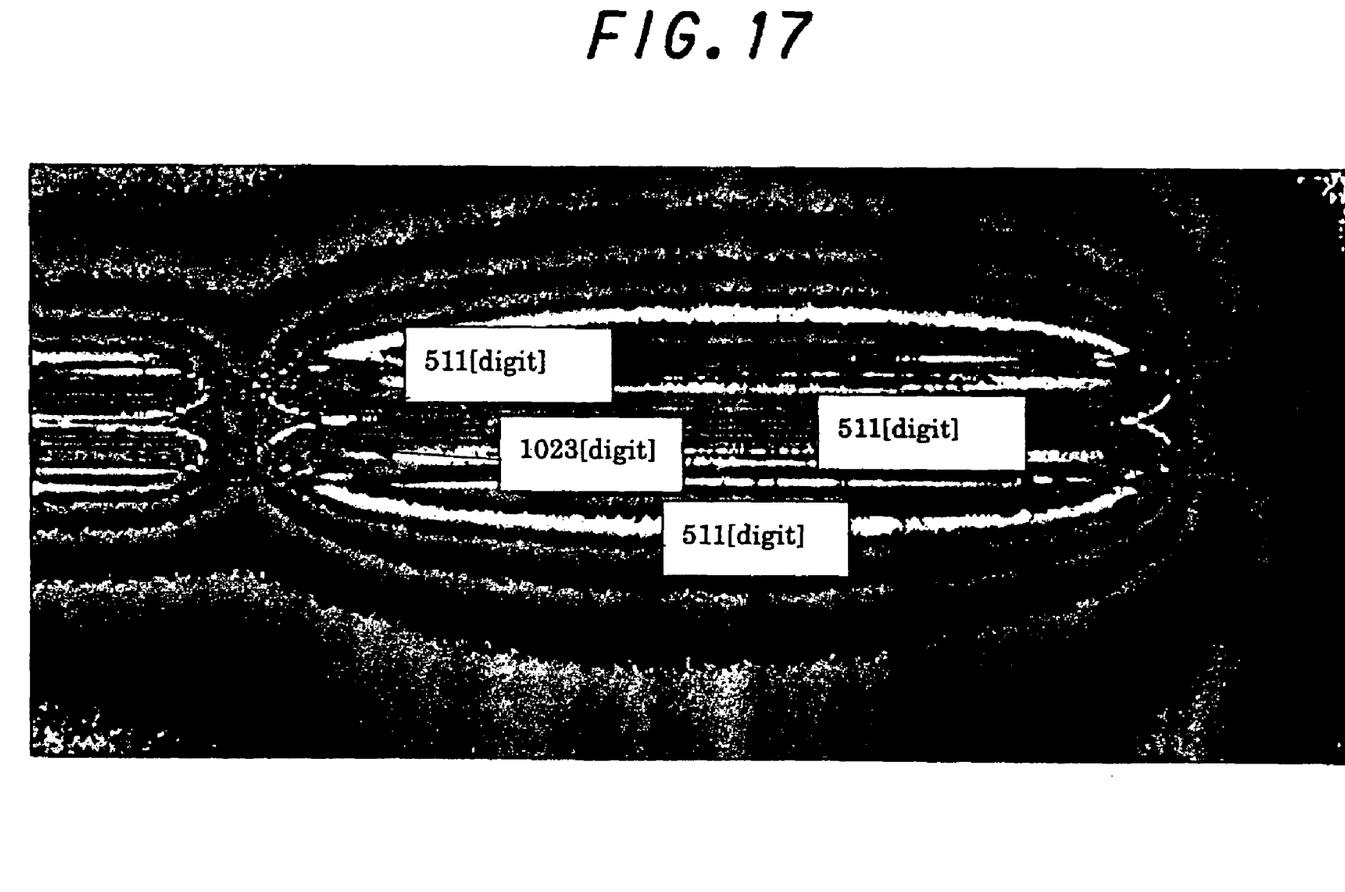
FIG. 17 shows an exemplary condition of an image obtained by processing the image of FIG. 16 by an image processing device according to the present invention.

When an image shown in FIG. 16, which was taken by the image sensor 7, is processed by using a conversion table shown in FIG. 15, an image shown in FIG. 17 can be obtained wherein a whole luminous area is divided into a plurality of discrete divisions and a change in brightness of each of the discrete divisions is separately emphasized with halftone expression between respective discrete divisions.

Application of the present invention to the image sensor 7 capable of initializing respective pixels before taking an image to prevent the occurrence of afterglow enables the sensor to take pictures at a high speed (max. 400 frames per second), that allows the real-time analysis of luminance distribution of illumination, for example, enough to follow a flicker of a fluorescent lamp.

As is apparent from the foregoing, the image processing device according to the present invention uses means for converting image data input by an image sensor into image data emphasizing differences in brightness in each of plural divisions of a whole luminous area by using an image data conversion table and can therefore offer an advantage of easily and immediately processing for enhancing the contrast of an image taken by the image sensor having a wide dynamic range of its logarithmic output characteristic.

The invention claimed is:

1. An image processing device for emphasizing a contrast of an image taken by an image sensor composed of a plurality of light-sensor circuits each representing a unit pixel and comprising a photoelectric converting element for producing a sensor current proportional to a quantity of incident light falling thereon, a MOS type transistor having a logarithmic output characteristic in a weak inverse state for converting the sensor current produced by the photoelectric converting element into a voltage signal, and an initializing means for initializing the sensor circuit by removing electric charge accumulated in the parasitic capacity of the photoelectric converting element by changing a drain voltage of the MOS type transistor to a level lower than a normal for a specified period, and an outputting means for outputting an image signal having a logarithmic response characteristic at a large sensor current and a sensor signal having a non-logarithmic response characteristic at a small sensor current, wherein a whole luminous area of an image is divided equally into a plurality of continuous divisions, and an image data from the image sensor is converted by using a conversion table into image data with emphasis of a change in brightness in each of the divisions to represent the luminous distribution in a gray level contour line map.

2. An image processing device as defined in claim 1, wherein a whole luminous area of an image is divided into a plurality of discrete divisions and a change in brightness in each of the divisions separately emphasized.

3. An image processing method for emphasizing a contrast of an image taken by an image sensor composed of a plurality of light-sensor circuits each representing a unit pixel and comprising a photoelectric converting element for producing a sensor current proportional to a quantity of incident light falling thereon, a MOS type transistor having a logarithmic output characteristic in a weak inverse state for converting the sensor current produced by the photoelectric converting element into a voltage signal, and an initializing means for initializing the sensor circuit by removing electric charge accumulated in the parasitic capacity of the photoelectric converting element by changing a drain voltage of the MOS type transistor to a level lower than a normal for a specified period, and an outputting means for outputting an image signal having a logarithmic response characteristic at a large sensor current and a sensor signal having a non-logarithmic response characteristic at a small sensor current, comprising the steps of dividing equally a whole luminous area of an image into a plurality of continuous divisions and converting data of the image from the image sensor by using a conversion table into image data with an emphasis on a change in brightness in each of the divisions to represent the luminous distribution in a gray level contour line map.

4. An image processing device as defined in claim 3, wherein a whole luminous area of an image is divided by the conversion table into a plurality of discrete divisions and a change in brightness in each of the divisions is separately emphasized.

* * * * *